US012764675B2

(12) United States Patent
Khalifa et al.

(10) Patent No.: US 12,764,675 B2
(45) Date of Patent: Oct. 13, 2026

(54) SMART CELL ZOOMING—REINFORCEMENT LEARNING FOR ENERGY-SAVING

(71) Applicant: Dell Products L.P., Round Rock, TX (US)

(72) Inventors: Medhat Mohamed Khalifa, Giza (EG); Joyce Tawfik Magdy Tawfik, Cairo (EG); Marwan Mansour, Alexandria (EG); Mirette Maged Ramzy Habib, Cairo (EG); Mohamed Abouzeid, El Sheikh Zayed (EG)

(73) Assignee: DELL PRODUCTS L.P., Round Rock, TX (US)

( * ) Notice: Subject to any disclaimer, the term of this patent is extended or adjusted under 35 U.S.C. 154(b) by 234 days.

(21) Appl. No.: 18/808,350

(22) Filed: Aug. 19, 2024

(65) Prior Publication Data

US 2026/0052485 A1 Feb. 19, 2026

(51) Int. Cl.
*H04W 52/32* (2009.01)
*H04W 24/02* (2009.01)
*H04W 28/086* (2023.01)

(52) U.S. Cl.
CPC ......... *H04W 52/322* (2013.01); *H04W 24/02* (2013.01); *H04W 28/086* (2023.05)

(58) Field of Classification Search
CPC . H04W 52/322; H04W 24/02; H04W 28/086; H04W 52/343
See application file for complete search history.

(56) References Cited

U.S. PATENT DOCUMENTS

2022/0159586 A1* 5/2022 Choi .................. H04W 52/143

FOREIGN PATENT DOCUMENTS

CN 116320743 B * 3/2026 ............. G06V 20/10
WO WO-2024086457 A1 * 4/2024 .......... H04W 36/362
WO WO-2025069102 A1 * 4/2025 ........... H04W 24/02

OTHER PUBLICATIONS

Xu, et al. "Adaptive Cell Zooming and Sleeping for Green Heterogeneous Ultradense Networks" IEEE Transactions on Vehicular Technology, vol. 67, No. 2, Feb. 2018, 10 pages.
Jiang, et al. "An Energy-Efficient Framework for Internet of Things Underlaying Heterogeneous Small Cell Networks" IEEE Transactions on Mobile Computing, vol. 21, No. 1, Jan. 2022, 13 pages.
(Continued)

*Primary Examiner* — Michael A Keller
(74) *Attorney, Agent, or Firm* — Amin, Turocy & Watson, LLP

(57) ABSTRACT

Reinforcement learning models are used to reduce the power consumption of cellular wireless networks. A method comprises receiving groups of key performance indicator data, based on the groups of key performance indicator data, using a trained reinforcement learning model to identify a candidate network equipment from groups of network equipment, generating, based on the group of key performance indicator data, actions to be performed by the candidate network equipment and zooming factor values to be used by the candidate network equipment to adjust broadcast coverage areas associated with the candidate network equipment; and transmitting, to the candidate network equipment, the action to be performed and the zooming factor value.

20 Claims, 10 Drawing Sheets

(56) References Cited

OTHER PUBLICATIONS

Gosh, et al. "5G-ZOOM-Game: small cell zooming using weighted majority cooperative game for energy efficient 5G mobile network" Wireless Networks (2020) 26:349-372, 24 pages.
Zhang, et al. "One Integrated Energy Efficiency Proposal for 5G IoT Communications" IEEE Internet of Things Journal, vol. 3, No. 6, Dec. 2016, 9 pages.
3GPP "5G; Management and orchestration; 5G performance measurements (3GPP TS 28.552 version 16.6.0 Release 16)" 3GPP, Aug. 2020, 196 pages.

* cited by examiner

400

| Action | Recommended Consequence |
|---|---|
| 0 | No Action |
| 1 | 10% Zoom In |
| 2 | 25% Zoom In |
| 3 | 50% Zoom In |
| 4 | 75% Zoom In |
| 5 | 100% Zoom In |
| 6 | 10% Zoom Out |
| 7 | 25% Zoom Out |
| 8 | 50% Zoom Out |
| 9 | 75% Zoom Out |
| 10 | 100% Zoom Out |

FIG. 4

SMART CELL ZOOMING—REINFORCEMENT LEARNING FOR ENERGY-SAVING

BACKGROUND

The open radio access network (O-RAN) initiative is an effort to create an open, interoperable, and flexible architecture for radio access networks (RAN). The O-RAN Alliance, which drives this initiative, aims to standardize interfaces and define specifications to ensure that different vendors' equipment can work together seamlessly. This O-RAN approach contrasts with traditional RAN solutions, which are often proprietary and vendor-specific.

Wireless cellular networks are experiencing increased global energy demands due to the increasing number of subscribers and traffic volume. To reduce energy consumption, mobile network operator (MNO) entities are considering designing green networks.

Cell zooming adjusts the monitoring and/or broadcast coverage area associated with network devices, such as cell equipment, base transceiver station (BTS) equipment, base station (BS) equipment (e.g., gNB equipment, eNodeB equipment, . . . ), and the like, based on traffic conditions. However, there are significant issues associated with cell zooming in the context of fifth generation (5G) fifth-generation cellular networks particularly with respect to dynamic traffic demands, signaling overhead, and balancing energy saving with network quality.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 4 illustrates a table of actions and corresponding recommended consequences, for implementing smart cell zooming using reinforcement learning for energy savings, in accordance with various non-limiting example embodiments.

DETAILED DESCRIPTION

Figure 1:
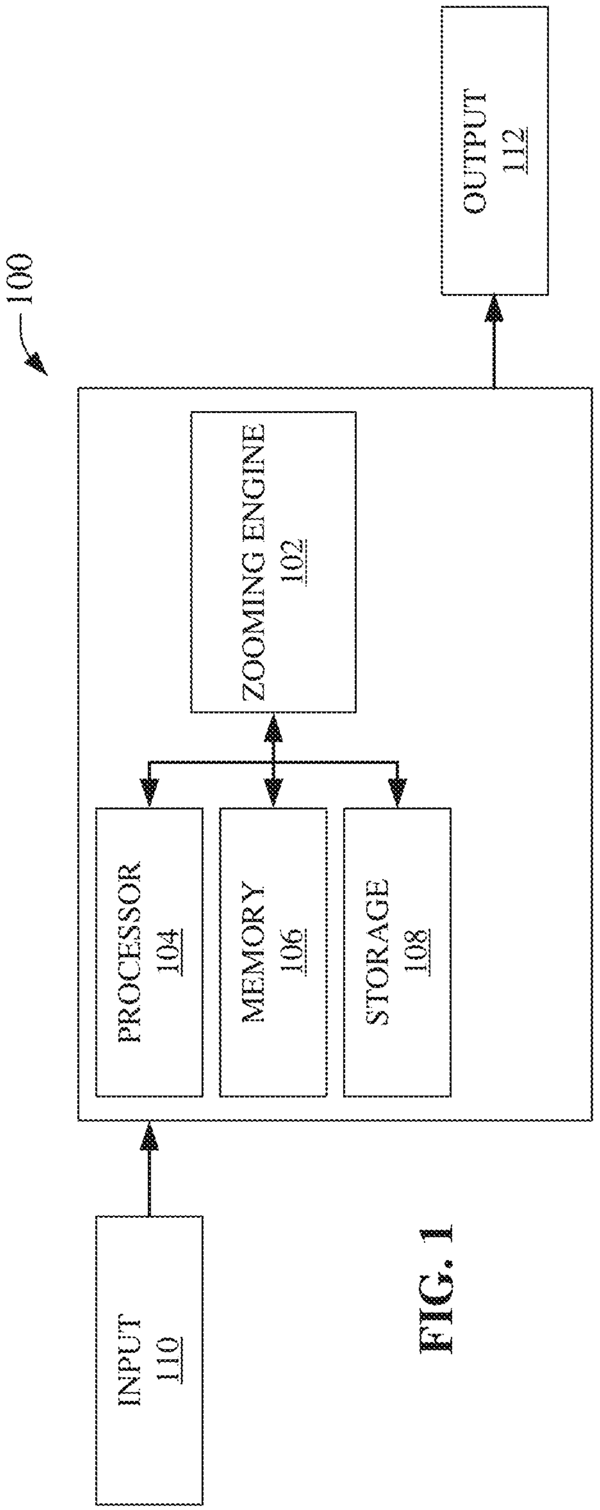
FIG. 1 illustrates a block diagram of a system for implementing smart cell zooming using reinforcement learning for energy savings, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

In accordance with various example embodiments, a system, apparatus, or device is provided comprising: a processor; and a memory that stores executable instructions that, when executed by the processor, facilitate performance of operations. The operations can comprise: receiving, from respective cell equipment, respective key performance indicator data representative of cell equipment load data representative of respective loads corresponding to the respective cell equipment and user equipment coverage data representative of respective coverages of the respective cell equipment with respect to facilitating respective network services for user equipment, based on the cell equipment load data and the user equipment coverage data, using a trained reinforcement learning model to identify a candidate cell equipment from the respective cell equipment, wherein the candidate cell equipment is determined to be a cell equipment of the respective cell equipment capable of adjusting a broadcast coverage area associated with the candidate cell equipment, generating, based on the respective key performance indicator data, an action to be performed by the candidate cell equipment and a zooming factor value to be used by the candidate cell equipment to adjust the broadcast coverage area associated with the candidate cell equipment, and transmitting, to the candidate cell equipment, action data representative of the action to be performed and the zooming factor value.

Other operations can comprise: as a result of the transmitting of the action data and the zooming factor value, the candidate cell equipment, based on the zooming factor value, is to reduce a transmission power level value associated with enabling the broadcast coverage area associated with the candidate cell equipment, as a result of the transmitting of the action data and the zooming factor value, the candidate cell equipment is to adjust an antenna azimuth to reduce the broadcast coverage area associated with the candidate cell equipment, as a result of the transmitting of the action data and the zooming factor value, the candidate cell equipment is to increase a transmission power level value associated with enabling the broadcast coverage area associated with the candidate cell equipment, and as a result of the transmitting of the action data and the zooming factor value, the candidate cell equipment adjusts an antenna azimuth to increase the broadcast coverage area associated with the candidate cell equipment.

Additional operations can comprise: in response to the transmitting of the action data and the zooming factor value resulting in the candidate cell equipment receiving the action data but not receiving the zooming factor value, the candidate cell equipment is to perform no action, thereby maintaining the broadcast coverage area unchanged, as a result of the transmitting of the action data, the candidate cell equipment is to powers down into a hibernation state where no power is expended to enable the broadcast coverage area, and as a result of the transmitting of the action data and the zooming factor value to the candidate cell equipment and as a result of the candidate cell equipment acting, after the transmitting, to adjust the broadcast coverage area associated with the candidate cell equipment, respective power consumption usage levels of the respective cell equipment are reduced.

In accordance with further embodiments, the subject disclosure describes a method, comprising a sequence of acts that can include: receiving, by base station equipment comprising at least one processor, a group of key performance indicators representative of cell equipment load data and user equipment coverage data, wherein the group of key performance indicators is received from a group of cell equipment, based on the cell equipment load data and the user equipment coverage data, using, by the base station equipment, a trained reinforcement learning model to identify a candidate cell equipment from the group of cell equipment, wherein the candidate cell equipment is identified from at least one of the group of cell equipment comprising a capability to modify a broadcast coverage area associated with the candidate cell equipment, based on the group of key performance indicators, determining, by the base station equipment, an action to be performed by the candidate cell equipment and a zooming factor value to be used by the candidate cell equipment to modify the broadcast coverage area associated with the candidate cell equipment, and sending, by the base station equipment to the candidate cell equipment, action data representative of the action to be performed and the zooming factor value.

Concerning the foregoing, the cell equipment load data comprises location data associated with at least one of the group of cell equipment, the cell equipment load data comprises neighbor relationship data representative of neighbor relationships between at least the candidate cell equipment and the group of cell equipment, the cell equipment load data comprises mean data representative of a group of average numbers of radio resource control connections established between each cell equipment included in the group of cell equipment and respective user equipment situated within respective broadcast coverage umbrae associated with each cell equipment, and the cell equipment load data comprises power level data representative of respective transmission power level values associated with respective cell equipment included in the group of cell equipment.

Further in regard to the foregoing, the user equipment coverage data comprises location data representative of respective locations of at least one user equipment within respective broadcast coverage areas associated with respective cell equipment included in the group of cell equipment, and the user equipment coverage data comprises radio frequency condition data representative of respective conditions being experienced by at least one user equipment within respective broadcast coverage areas associated with respective cell equipment included in the group of cell equipment.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: receiving, from respective network equipment, respective key performance indicator data representative of network equipment load data representative of respective loads corresponding to the respective cell equipment and user equipment coverage data representative of respective coverages of the respective cell equipment, based on the network equipment load data and the user equipment coverage data, and based on an output from a trained reinforcement learning model, selecting a candidate network equipment from the respective network equipment, wherein the candidate network equipment is one of at least one network equipment of the respective network equipment determined to be capable of changing a broadcast coverage area associated with the candidate network equipment by changing at least one parameter associated with the broadcast coverage area, generating, based on the respective key performance indicator data, at least one group of actions to be performed by the candidate network equipment and a zooming factor value to be used by the candidate network equipment to change the broadcast coverage area associated with the candidate network equipment, and transmitting, to the candidate network equipment, action data representative of the at least one group of actions to be performed and the zooming factor value.

In relation to the foregoing, the network load data comprises respective location data associated with at least one of the respective network equipment, the network equipment load data comprises respective data representing respective average numbers of radio resource control connections respectively established between the respective network equipment and respective user equipment situated within respective broadcast coverage umbrae associated with the respective network equipment, and the user equipment coverage data comprises radio frequency condition data representative of respective conditions being experienced by respective user equipment within respective broadcast coverage areas associated with the respective network equipment.

Additional operations can include, after the at least one group of action is performed by the candidate network equipment and after the zooming factor value is used by the candidate network equipment to change the broadcast coverage area associated with the candidate network equipment, as a consequence, respective power consumption usage levels of the respective network equipment are reduced.

As noted earlier, wireless cellular networks are experiencing increased global energy demands due to the increasing number of subscribers and traffic volume. To reduce energy consumption, mobile network operator (MNO) entities are considering designing environmentally friendly sustainable wireless networks.

Cell zooming adjusts the monitoring and/or broadcast coverage areas associated with network devices, such as base transceiver station (BTS) equipment, base station (BS) equipment (e.g.,—NodeB equipment, eNodeB equipment, access point (AP) equipment, . . . ), and the like, based on network traffic conditions. Further, cell zooming can potentially reduce energy consumption significantly. Currently the use of static cell zooming processes (e.g., adjusting the coverage area at typically unwavering/static pre-identified pre-defined time periods) have been able to attain maximum power savings in the range of about 50%. It has nevertheless been observed that by using dynamic zooming processes, throughout the day, can yield much greater power savings. Nevertheless, there can be significant issues associated with cell zooming in the context of fifth generation (5G) fifth-generation cellular networks, particularly with respect to dynamic traffic demands, signaling overhead, and balancing energy saving with network quality.

As proposed herein, an O-RAN based intelligent solution involving cell zooming and the use of a coverage controller xApp (e.g., software applications designed to run on RAN equipment in 5G networks and leverage a 5G network's capabilities to deliver various services and functionalities) nominates cell equipment the broadcast coverage areas of which are to be zoomed in, or zoomed out, with specific zoom factor values depending on key performance indicator (KPI) values that can have been output from an E2 Node interface (e.g., an interface of E2 Node equipment that facilitates communication between RAN equipment and RAN intelligent controller (RIC) equipment), thereby adjusting the cell equipment's broadcast/transmission coverage by transmitting control messages to zoom in or zoom out the broadcast/transmission coverage umbrae/penumbrae, and/or fully shut down the cell equipment in control of the broadcast/transmission coverage umbrae/penumbrae depending on actions recommended by a trained and deployed reinforcement learning (RL) model.

In regard to fully shutting down the cell equipment, this action, in some embodiments, can involve placing the cell equipment into a low power mode akin to placing the cell equipment into a state of stasis, wherein minimal power is expended sufficient enough to bring the cell equipment back online on an as needed or priority basis. In additional and/or alternative embodiments, the action of shutting down the cell equipment can entail the powering off of selected, generally high power consumption, components associated with the cell equipment, while leaving the cell equipment in a mode that allows it to monitor for signals, indicating that the cell equipment should revive itself from an imposed state of stasis.

This disclosure provides an xApp solution that dynamically and intelligently zooms cells in and/or zooms cells out based on trained and deployed reinforcement learning (RL) based cell zooming nominator processes that adjust, tune, or maximize energy efficiency and respective cell equipment broadcast coverage areas, recommending distances for controlling cell equipment transmission coverage while at the same time taking into consideration user equipment (UE) quality of service (QoS) metrics to enhance cell zooming.

Typical technology and systems that can be used to effectuate the subject disclosure can include O-RAN radio intelligent controller (RIC) equipment, service management and orchestration (SMO) equipment, and E2 Node equipment operational as RAN equipment. Additional equipment can also include O-RAN near real-time radio intelligent controller (near real-time RIC) equipment. Operational on the foregoing equipment can be modules (components) that can nominate cell equipment to be zoomed in and zoomed out, can recommend distances to which nominated cell equipment should be zoomed in or zoomed out, and can monitor and control the zooming of nominated cell equipment, With regard to O-RAN RIC equipment generally provides centralized control and orchestration functions, it enables intelligent RAN management through real-time analytics and machine learning. There are at least two types of RIC equipment, near-real time RIC equipment and non-real-time RIC equipment. Near-real time RIC equipment provides control and optimization functions with low latencies, typically within 10 millisecond (ms) to 1 second; includes performing tasks like dynamic spectrum management, handover optimization, and traffic steering; and generally is located close to edge equipment in order to minimize latency. Non-real-time RIC equipment, in contrast, provides higher-level control and policy management with latencies generally greater than 1 second. Non-real-time RIC equipment typically involves performing long-term optimization tasks like policy management, network analytics, and machine learning model training, and typically resides in a centralized data center.

The key components of near-real time RIC equipment are xApps-modular applications that can execute on near-real time RIC equipment to provide specific control functions, such as applications for load balancing, interference management, and mobility optimization. Key components of the non-real-time RIC equipment are rApps-modular applications that run on non-real-time RIC equipment to provide higher-level control and management functions, such as applications for network planning, performance diagnostics, and anomaly detection.

Additionally, a further key aspect of RIC equipment is an E2 interface situated on E2 node equipment. The E2 interface provides an interface between the RIC equipment and the RAN equipment, such as cell equipment (e.g., base station equipment). The E2 interface enables the exchange of control information and policies between the RIC equipment and the RAN equipment.

As has been observed above, with the increasing traffic demands of wireless cellular networks, there has also been an increase in global energy demand. Additionally, the number of subscribers and associated traffic volumes in cellular networks have explosively increased, and the proliferation of numerous networking equipment, such as cell equipment, base station equipment, and the like has contributed significantly to a MNO's high energy consumption. MNOs, in order to significantly reduce their energy consumption, are now designing environmentally friendly green cellular networks.

Currently, the cell size (e.g., geographical broadcast area covered by a cell tower, also known as base station equipment, cell equipment site, etc.) that provides wireless communication services and capacity in current cellular networks is generally fixed based on an estimated peak traffic load. However, since traffic flows can constantly fluctuate throughout the day, conventional solutions have placed determined numbers of cell equipment into low power stasis modes/hibernation modes, and/or have rendered other cell equipment temporarily inoperable (e.g., turned off) when the traffic load is low in order to conserve energy across the entire network. This is the concept of cell zooming, which adaptively adjusts the cell size based on traffic conditions. Cell zooming can potentially reduce energy consumption.

It has been observed that static cell zooming is capable of achieving a maximum power-saving of about 50% since static cell zooming is typically used during off-peak hours, which is typically not more than 12 hours. Meanwhile, dynamic cell zooming, where cell equipment adjust their coverage areas dynamically can operate throughout a 24-hour period.

However, there are nonetheless a variety of challenges in the use of dynamic cell zooming, such as accounting for: 5G dynamic traffic demands and new architecture, signaling overhead being introduced by on/off switching delays caused by the exchange of traffic information, determining information about the spatial distribution of traffic, and also the trade-offs between energy saving and the effects on quality of services (QoS) as a result of uncertainties in the forecast of traffic information in the network.

In regard to static cell zooming, the broadcast area associated with cell equipment is zoomed in and zoomed out during manually (e.g., by experts) defined (e.g., predefined) time periods, typically when low traffic demand is expected or when specified traffic thresholds are reached. Traffic arrival patterns that are continuously fluctuating and different QoS demands can make static cell zooming unreliable.

Concerning dynamic cell zooming, specified KPIs for each cell equipment can be dynamically inspected, and based on these specified KPIs cell zooming decisions can be made. Different approaches have been proposed in regard to dynamic cell zooming. A first approach is based on a heuristic greedy process that considers the number of end-users (e.g., user equipment) being served by each cell equipment, the bandwidth being used by each user equipment, and probabilities of outages based on user equipment signal-to-interference plus noise ratios (SINRs). This approach, however, is deficient since dynamic pattern changes are part of the nature of operation of 5G networks, which dynamic pattern changes can cause any solution based on the heuristic greedy process to reach suboptimal results and/or require constant updates in the heuristics and their priorities due to the co-existence of multiple QoS-flows among connected user equipment.

A second approach is based on using game theory to optimize cell zooming factors, targeting the reduction of area power consumption. This strategy is based on the strongest reference signal receive power (RSRP) value. The game theory approach, however, is also unsatisfactory in that it focuses solely on "cell zooming" without adequately factoring in the impact to user equipment QoS requirements.

A third approach considers the angle and the distance of user equipment with respect to base station equipment for configuring massive multiple input multiple output (MIMO) for cell zooming. This approach, however, is only applicable to MIMO deployments. Additionally, the approach considers angle data and distance data from a user equipment perspective. In contrast, the approach disclosed in the context of this disclosure considers the network state holistically. Moreover, this third strategy fails to take into consideration the QoS metrics of user equipment.

A fourth strategy uses weighted majority game theory based on the available loads, minimum distances between user equipment and cell equipment, monitoring and controlling the cell equipment's transmission area, aiming to connect a maximum possible number of user equipment within the cell equipment's broadcast area by increasing the transmission coverage area projected by cell equipment for a majority cell equipment. The deficiencies of this approach are similar to those outlined with regard to the second strategy, where the game-theory approaches the number of KPIs considered including cell equipment load metric data, but not user equipment QoS metric data.

This disclosure, in contrast to the four approaches above, can enhance the current state of cell zooming. It has been observed that in the future 5G cellular network infrastructures will be used for a wide variety of applications, each application with its own unique QoS requirements; not taking into consideration these various needs will cause degradation in the service provided to the user equipment hosting these applications. Also noted is the fact that 5G can be more susceptible to traffic fluctuations, therefore having a process that is able to adapt to pattern shifts can be crucial. Further, herein, example solutions beneficially consider the entirety of a network deployment, not just small numbers of adjacent cell equipment. Additionally, one or more solutions detailed herein provide a more granular approach by adjusting the cell equipment coverage area to achieve both energy efficiencies and preserve network performance, rather than the current approach of switching cell equipment on and off based on static predetermined network conditions and strict adherence to inflexible threshold values.

The described solution is an O-RAN-based solution that uses a deployable reinforcement learning (RL) based xApp agent deployed and operational on near real-time RIC equipment. In some embodiments, cell zooming nomination and coverage control is performed by determining cell equipment (and/or groups of cell equipment) that are to be nominated to zoom in or zoom out with defined zoom factor values in order to minimize RAN energy consumption, while maintaining good, or at least threshold satisfactory, QoS for the connected user equipment. The implemented process can be applied to all cell equipment under control of E2 Node equipment registered with specified near real time RIC equipment.

The RL cell zooming xApp agent, in operation, can define a state of the cellular wireless infrastructure using a group of data representing metrics associated with the distribution of user equipment within the broadcast/transmission umbrae of groups of cell equipment included in the cellular wireless infrastructure. The RL cell zooming xApp agent can also use cell equipment load metrics that can involve determining physical resource block (PRB) utilization, determining the number user equipment connected to cell equipment using the radio resource control (RRC) protocol, determining cell equipment geographic locations (e.g., using global navigation satellite system (GNSS) coordinates, spherical or geodetic coordinate system data [e.g. geographic coordinate system (GCS) data], and the like), using user equipment metric data representing received signal receive power (RSRP) data and signal-to-interference plus noise ratio (SINR) data received from user equipment within the broadcast umbrae/penumbrae of cell equipment comprising the wireless cellular infrastructure, employing user equipment QoS metric data and/or 5G QoS identifier (5QI) data received from user equipment, using automatic neighbor relation (ANR) data received from user equipment, and employing cell coverage data such as antenna azimuth values, transmission power values, antenna height values, and maximum power values.

In regard to PRBs, a PRB is generally a unit of resource allocation in a frequency domain, it is typically the smallest unit of resources that can be allocated to user equipment, and generally can consist of a defined number of subcarriers in the frequency domain over specific time durations. PRBs are used to allocate radio resources efficiently and to manage the transmission of data over a communication link (air interface) established between user equipment and associated cell equipment. It should be noted the air interface is generally responsible for managing how user equipment connect to the cellular wireless infrastructure, handling data transmissions, and maintaining communication quality.

The RRC protocol is responsible for managing the radio resources and controlling the connection between the user equipment and the cellular wireless infrastructure. The protocol's key responsibilities are: (a) handle the setup, maintenance, and release of radio connections between user equipment and the cellular wireless infrastructure; (b) allocate and manage radio resources required for communication; (c) handle handovers ensuring seamless transitions when user equipment moves between different controlling base station equipment, (e.g., user equipment moving between cell equipment and/or areas); (d) ensure the appropriate level of service quality for different types of data traffic; and (c) set up and manage logical channels for data transfer.

5QI data used in 5G networks to specify the quality of service requirements for different types of data traffic. 5QI data is a key part of the QoS framework in 5G, which aims to support diverse use cases with varying performance needs. Generally, 5QI data can comprise a value associated with defined QoS parameters, such as (i) priority level-how important the traffic is compared to other types of traffic; (ii) packet delay budget—the acceptable delay for the data packets; (iii) packet error rate—the allowable error rate for the transmitted data; and (iv) data rate—the required data rate for the service. By assigning different 5QI values to different types of traffic (e.g., video streaming, voice calls, IoT data), the cellular wireless infrastructure can efficiently manage resources and ensure that each type of traffic meets its performance requirements, which can aid in maximizing user experience and network performance.

ANR data is generally used to maximize the wireless cellular infrastructure's ability to manage neighboring cell equipment and ensure seamless handovers as user equipment moves through the wireless cellular infrastructure. Key aspects of the ANR process include: (i) automatically detecting neighboring cells that might be relevant for a given cell equipment's coverage area-essential for maintaining a list of potential target cell equipment for handovers; (ii) neighbor list management-once neighboring cells are detected, ANR automatically updates a neighbor cell list (NCL), which can be crucial for efficient handovers, as it informs the network which cell equipment to consider when user equipment moves out of the current cell equipment's coverage area; (iii) ANR allows the network to adapt to changes, such as the introduction of new cell equipment, removal of old equipment, or changes in cell equipment coverage due to factors like weather or urban development, which can help maintain network efficiency and reduces the need for manual adjustments by network operators; and (iv) ensuring that the neighbor cell list is always up to date and accurate, ANR improves the efficiency and reliability of handovers, reducing the likelihood of dropped calls or data sessions as user equipment move from first cell equipment to second cell equipment.

The cell zooming xApp agent as outlined above, based on the defined state of the cellular wireless infrastructure (as stated above), can define an action space that can include possible actions that can be undertaken by a deployed cell zooming xApp agent (e.g., trained/deployed RL based xApp agent), such as zoom in, zoom out, and/or take no action. The deployed cell zooming xApp agent can be rewarded and/or penalized on the basis of whether or not cellular wireless infrastructure energy consumption is minimized and network performance in terms of reported user equipment QoS metric data has been maximized.

The disclosed cell zooming xApp agent can provide a novel solution as it proactively mitigates both the risk of user equipment QoS degradation and handles the challenge of maintaining service level agreements (SLAs) and saving energy at the same time, which has been a major challenge in the existing dynamic solutions. This has been addressed by the implementation of reinforcement learning based xApp agent reward functions which can be based on both energy saving and QoS. Also having 5QI data associated with user equipment as input to the cell zooming xApp agent instantiation/model can accommodate for the dynamic QoS requirements adapting to the changing needs of users. Also deploying a reinforcement learning model can account for any pattern drifts that might occur overtime. Not only does the Xapp agent instantiation/model nominate zooming in or zooming out but also recommends the factor values of zooming for a better experience.

Figure 3:
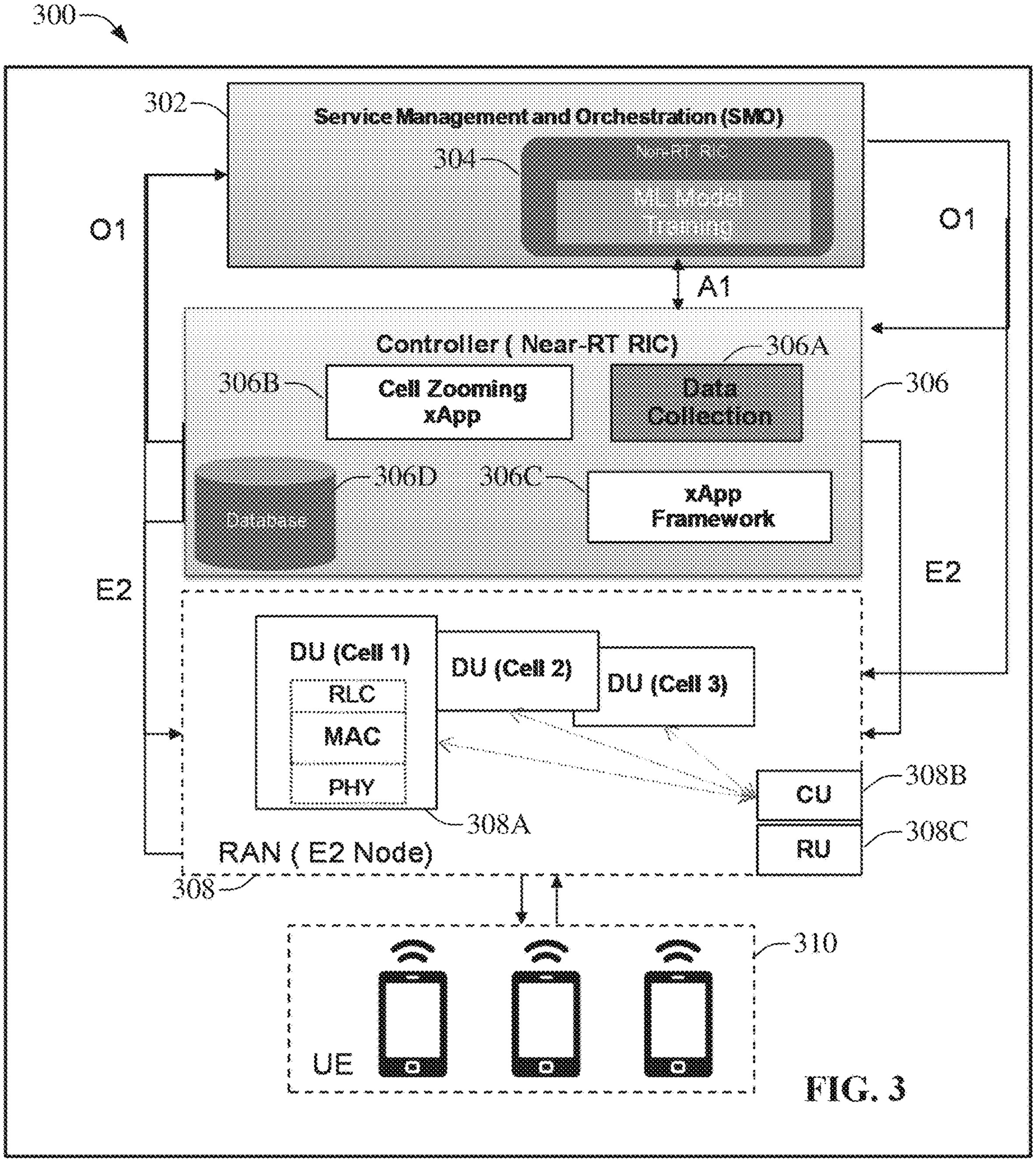
FIG. 3 illustrates a generalized system architecture, for implementing smart cell zooming using reinforcement learning for energy savings, in accordance with various non-limiting example embodiments.

FIG. 3 depicts generalized example system architecture 300 for implementing smart cell zooming using reinforcement learning for energy savings, in accordance with various example embodiments. System architecture 300 can comprise service management and orchestration (SMO) equipment 302. SMO equipment 302 can act as a management and orchestration layer that can control the configuration and automation aspects of RIC equipment and RAN elements, SMO equipment 302 can also onboard xApps and rApps onto the RIC equipment.

System architecture 300 can also comprise non-real time (Non-RT) RIC equipment 304 that can be functionally controlled and/or operational under the aegis of SMO equipment 302. Non-RT RIC equipment 304 can host machine learning (ML) training embodiments that can train ML models for xApps.

Additionally, as illustrated in FIG. 3, system architecture 300 can include near-real time RIC equipment 306, comprising data collection component 306A, cell zooming component 306B, xApp framework 306C, and database 306D. Data collection component 306A can receive and collect data from various network components, such as cell equipment and user equipment. The collected data can comprise cell equipment load data and user equipment coverage data such as ANR data, RRC connection data for each cell equipment comprising the wireless cellular infrastructure, numbers of user equipment operational in the wireless cellular infrastructure, as a whole, and within each cell equipment site controlled by cell equipment in particular, data associated with specific geo-positioning locations of user equipment within the wireless cellular infrastructure as a whole, and/or within the coverage ambit of each cell equipment site controlled by individual cell equipment supervising defined cell equipment sites, antenna azimuth data that can provide indication of the various respective antennae azimuths for groups of antennae associated with each cell equipment included in the wireless cellular infrastructure and/or segments of the overall wireless cellular infrastructure.

Cell zooming component 306B can subscribe to KPIs received on E2 interfaces to identify which cell equipment should be zoomed in or zoomed out and recommend the maximum zoom in or maximum zoom out distances, and accordingly takes control actions to zoom cell equipment in/out with a specific defined factor or cause cell equipment to be placed in one or more hibernation low power state.

xApp framework 306C can expose application programming interfaces (APIs) for xApps to subscribe on new registered E2 node equipment and configuration updates.

Concerning database 306D, this can be database equipment of a grouping of database equipment that can store KPIs collected from E2 node equipment 308. Further, database equipment 306D can persist subscription details such as data associated with KPI data, accepted/failed requests, and the like.

In regard to E2 node equipment 308, these can be main elements in the architecture of the 5G network, particularly within the O-RAN framework. E2 node equipment can play a role in enabling flexible and intelligent radio resource management and optimization through the use of RICs. E2 node equipment can be any RAN equipment that connects to the RIC via an E2 interface. E2 node equipment can comprise gNB equipment (5G base station equipment), eNB (4G base station equipment), and other network equipment that handle radio functions.

Generally, E2 node equipment is responsible for executing various RAN functions, including: (a) radio resource management functionalities, such as allocating physical resource blocks (PRBs) to users, managing frequency channels, and controlling power levels; (b) mobility management functions such as, handling handovers between cell equipment as user equipment travel across the network, ensuring seamless connectivity; (c) interference management responsibilities such as reducing interference between cell equipment, and improving overall network performance, often through coordination with other E2 node equipment and the RIC equipment; (d) QoS management ensuring that the network meets the required service levels for different types of traffic, such as high-priority data or real-time communications; and (c) network slicing enabling the creation of virtualized network slices that cater to different types of services, such as enhanced mobile broadband (cMBB), massive IoT (mIoT), and ultra-reliable low-latency communication (URLLC).

As also illustrated in FIG. 3, there can be groups of user equipment 310 that can be in communication with the E2 node equipment 308.

FIG. 3 also illustrates various interfaces (e.g., O1, A1, and E2) that establish communication channels between the various components included in system architecture 300. An O1 interface is generally responsible for communication between SMO equipment 302 and the O-RAN elements like the O-RU (O-RAN radio unit) 308C, O-DU (O-RAN distributed unit) 308A, and O-CU (O-RAN centralized unit) 308B.

The O1 interface handles functions such as configuration management, performance management, and fault management. Also the O1 interface is used to collect telemetry data from the RAN equipment, which can be used for monitoring and optimizing network performance. Additionally, through the O1 interface, the SMO can configure network elements, ensuring they are set up correctly to meet the desired service requirements. Further, the O1 interface facilitates interoperability between different vendors' equipment, which is a cornerstone of the O-RAN vision. This open interface allows mobile network operators to mix and match components from different suppliers, enhancing flexibility and reducing costs. Furthermore, the O1 interface supports automation and the integration of artificial intelligent/machine learning based tools for managing and optimizing the RAN, contributing to the evolution of more intelligent and self-optimizing networks.

An A1 interface typically connects non real-time RIC equipment to near real-time RIC equipment, enabling advanced network management and optimization functions. Generally, the A1 interface is used to transmit policies from the non real-time RIC equipment to the near real-time RIC equipment. These policies guide the behavior of the near real-time RIC equipment in managing the radio resources and optimizing the network performance in real-time or near real-time. The A1 interface can also be used to distribute machine learning models from the non real-time RIC equipment to the near real-time RIC equipment. These machine learning models can be used for predictive analysis and optimization tasks within the RAN. Also, the A1 interface can support the feedback loop from the near real-time RIC equipment to the non real-time RIC equipment, providing information about network performance and the effectiveness of the applied policies. This feedback can aid in refining policies and ML models over time. Moreover, like other interfaces in the O-RAN architecture, the A1 interface is designed to be open and standardized, allowing interoperability between different vendors' equipment, which aligns with the O-RAN Alliance's goal of creating a flexible and multi-vendor ecosystem.

The E2 interface is designed to facilitate communication between near real-time RIC equipment and the O-RAN network functionalities such as the O-DU 308A, O-CU 308B, and other RAN equipment. The E2 interface plays a key role in the real-time control and optimization of the radio access network. The E2 interface enables near-RT RIC equipment to collect real-time data from the O-RAN network functions. This data can be crucial for making instantaneous decisions to optimize the network's performance, such as managing radio resources, handling handovers, and adjusting power levels.

Further, through the E2 interface, near-RT RIC equipment can exert fine-grained control over the RAN functions. This can include implementing control loops that can adjust network parameters in near-real-time to respond to changing network conditions, such as varying traffic loads or mobility patterns. The E2 interface also allows for the deployment and operation of xApps, which are specialized applications running on the near-RT RIC equipment. xApps perform specific tasks like load balancing, interference management, or quality of service (QOS) optimization, all of which are enabled through interactions with the E2 interface.

Further, the E2 interface can also be used to enforce policies that are provided by the A1 interface from the non-RT RIC equipment. These policies can guide near-RT RIC equipment decisions and actions in managing the RAN functions. As has been noted with the other interfaces the E2 interface is designed to be open and standardized and align with the O-RAN Alliance's goals of creating a more flexible, multi-vendor RAN ecosystem.

Reinforcement learning (RL) is a type of machine learning where an agent learns to make decisions by performing actions in an environment to maximize a cumulative reward. The agent typically interacts with an environment, receives feedback in the form of rewards or punishments, and uses this feedback to improve its future actions.

The key aspects of RL are: (i) an agent: the learner or decision-maker that interacts with the environment, the agent takes actions based on a policy, which defines a behavior strategy; (ii) an environment: the external system with which the agent interacts, wherein the environment responds to the agent's actions and provides rewards and new states; (iii) state(s): a representation of a current situation of the agent within the environment, the state contains all the necessary information for decision-making; (iv) action (a): the choices available to the agent at each state, actions are selected based on the agent's policy; (v) reward (r): feedback from the environment as a result of the agent's action, the goal of the agent is to maximize cumulative rewards over time; (vi) policy ($\pi$): a strategy used by the agent to decide the next action based on the current state; policies can be deterministic (e.g., $\pi$: S→A, that is, a function from the group of states of the environment, S, to the group of actions, A) or stochastic (e.g., use a family of conditional probability distributions, $\pi$ (A|S), from the group of states, S, to the group of actions, A); (vii) value function (V): a function that estimates the expected cumulative reward from a given state following a particular policy-helps the agent to evaluate the desirability of states; and Q-Function (Q): a function that estimates the expected cumulative reward from taking a specific action in a given state and then following a particular policy, the Q-Function is also known as the action-value function.

FIG. 1 depicts a system 100 for implementing smart cell zooming using reinforcement learning for energy savings, in accordance with various non-limiting example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 100 can comprise zooming engine 102 that can be in operative communication with processor 104, memory 106, and storage 108. Zooming engine 102 can be in communication with processor 104 for facilitating operation of computer-executable instructions or machine-executable instructions and/or components by zooming engine 102; memory 106 for storing data and/or computer-executable instructions and/or machine-executable instructions and/or components; and storage 108 for providing longer term storage of data and/or machine-readable instructions and/or computer-readable instructions. Additionally, system 100 can also receive input 110 for use, manipulation, and/or transformation by zooming engine 102 to produce one or more useful, concrete, and tangible results, and/or transform one or more articles to different states or things. Further, system 100 can also generate and output the useful, concrete, and tangible result and/or the transformed one or more articles as output 112.

Zooming engine 102 can be responsible for identifying and executing opportunities for saving energy on radio unit (RU) (e.g., O-RU 308C)) transmissions based on the traffic conditions without degrading user equipment QoS. Cell zooming opportunities typically can occur when part of the energy resources used for transmission are not efficiently utilized. Thus, zooming engine 102 can operate to intelligently adjust the cell equipment's power consumption to save energy. However, taking binary disjoint decisions on a cell-by-cell basis, for each cell equipment, can lead to a loss of coverage in certain areas such as user equipment situated proximate to a cellular transmission edge boundary. In order to avoid the loss of coverage for users situated at the peripheral transmission extent of a cell equipment's broadcast coverage, zooming engine 102 can coordinate decisions between cell equipment to ensure that energy savings is undertaken without causing degradations in QoS to be experienced by user equipment, while also avoiding loss of coverage.

Zooming engine 102 thus can train reinforcement learning models and use the trained reinforcement learning models to centrally nominate specific groups of cell equipment to perform zooming in and/or zooming out functions, and thereafter generate and transmit, based on the trained and developed reinforcement learning models, groups of defined actions (e.g. zoom in, zoom out, take no action, cause cell equipment to power down into a stasis mode, and/or cause the cell equipment to be placed in a minimum power mode) for each cell equipment of the nominated groups of cell equipment to undertake and perform in determined situations to the cell equipment.

In order to facilitate nominating the groups of cell equipment to perform the zooming in and zooming out functionalities, a RL agent model instance in execution on system 100, and in particular operational on zooming engine 102, can receive as input the state of a defined number of cell equipment. While the specific cell equipment to be input as the defined number of cell equipment can be configurable by the MNO, zooming engine 102, nonetheless can maintain dynamic context compatibility as the input states can include location information associated with each cell equipment. The RL agent model instance can be deployed, for example, on one cell equipment of the defined number of cell equipment, respective RL agent model instances can be respectively deployed on each and every cell equipment of the defined number of cell equipment, and/or respective RL agent model instances can be deployed to a partial group of cell equipment comprising the defined number of cell equipment.

It should be observed that in some embodiments, system 100 can be a member of the defined number of cell equipment. It should further be observed that in some embodiments system 100 can also be used for purposes of training and generating the RL agent models and deploying the respective RL agent model instances to the defined number of cell equipment for subsequent execution on these cell equipment.

In regard to the cell equipment to which respective RL agent model instances can be dispatched, these can, in some embodiments, be situated in non-contiguous geographically diverse locations within a MNOs wireless cellular network infrastructure. In other embodiments the cell equipment can be proximate to one another but nevertheless not be geographically adjacent to one another, and in some other embodiments the cell equipment can be geographically abutting one another.

The input of state data associated with the cell equipment included in the defined number of cell equipment can comprise cell load data and/or user equipment coverage data. The cell load data and/or user equipment coverage data can be used to learn relationships between minimizing energy consumption and its tradeoff effects on coverage affecting extant user equipment situated within the respective broadcast coverage ambits and extents of each of the defined number of cell equipment.

In some embodiments, the cell load data can comprise geographic locations of the cell equipment, automatic neighbor relation (ANR) data, an average number of radio resource control (RRC) connections for each cell equipment, the number of active user equipment located in the coverage area of each cell equipment, PRB utilization for each cell equipment, and maximum transmission power being expended by each cell equipment in broadcasting signals to active user equipment within the broadcast umbra (and penumbra) projected and associated with each cell equipment.

In additional and/or alternative embodiments user equipment coverage data can comprise: (1) azimuth data (e.g., the horizontal angle from a cardinal direction, generally north, in a local or observer-centric spherical coordinate system; the relative position vector from an observer (origin) to a point of interest projected perpendicularly onto a reference plane (typically the horizontal plane); the angle between the projected vector and a reference vector on the reference plane is called the azimuth); (2) user equipment location data (e.g., geographic coordinate data indicating where user equipment are located generally, and more specifically where the user equipment is located in relation to its controlling/monitoring cell equipment); (3) transmission power data; (4) antenna height data; (5) neighbor data for each user equipment located within the broadcast transmission coverage area of each cell equipment; (6) user equipment 5QI data for each user equipment located within the broadcast coverage ambit of each cell equipment; and (7) user equipment radio frequency condition data, for each user equipment situated within the transmission scope of cell equipment, such as: received signal strength indicator (RSSI) values, reference signal received power (RSRP) values, reference signal received quality (RSRQ) values, signal-to-interference plus noise ratio (SINR) values, signal-to-noise ratio (SNR) values, and the like.

Based on receiving the input state data (e.g., cell load data and/or user equipment coverage data), zooming engine 102 can determine the state of the network (and/or specified partial segments of the wireless cellular network infrastructure) using data such as load statistics for cell equipment data, network deployment data, and/or user equipment condition data. In regard to load statistics per cell equipment data, a cell equipment load data value can be determined based, at least in part, on the number of active user equipment within the transmission coverage area extent associated with the cell equipment. Further, the load statistics per cell equipment data value can also be determined based on the average number of RRC connection data, and PRB utilization data. Additionally, the load statistics per cell equipment data value can also be ascertained based on determining a cell equipment spatial distribution of user equipment located within the coverage range of particular cell equipment.

Other data that can be used to determine the state of the network can include network deployment data. In this regard, zooming engine 102 can determine network deployment data based on cell equipment distribution information by determining cell equipment location using neighbor relation table data (e.g., a table data structure representative of the relationships and connections between network equipment (such as cell equipment, base station equipment, router equipment, access point equipment, internet of things (IoT) equipment, or user equipment) within a MNO cellular wireless network infrastructure). Zooming engine 102 can also determine network deployment data based on cellular equipment coverage information. Cell equipment coverage information can be based, for example, on: (i) cell equipment azimuth values; (ii) cell equipment transmission power values, (iii) cell equipment antennae height values (e.g., height values above relative terrain), and (iv) cell equipment transmission power values.

Zooming engine 102 can also determine the state of the network based on user equipment condition data. User equipment condition equipment data can be include using RSRP data and/or SINR data, which can be used to determine radio frequency conditions being experienced by user equipment situated within the transmission coverage areas afforded by cell equipment. Additionally, QoS data representing requirements identifying user equipment needs according to different use cases (e.g., what applications are operational on user equipment, such as streaming video applications, gaming applications, . . . , and the like) can be used. Generally data associated with user equipment QoS data can be included in 5QI data associated with respective user equipment.

Zooming engine 1G02 having determined the state of the network can determine an action space that determines groups of possible actions that an agent (e.g., when deployed to, and in execution on, cellular equipment in a live production environment—a RL agent model instance) can perform in response to different real-time production occurrences/circumstances. Possible actions that can be performed by the agent can comprise zooming in (e.g., ensuring that the broadcast transmission coverage area associated with cell equipment is reduced), zooming out (e.g., ensuring that the broadcast transmission coverage area associated with cell equipment is enlarged), take no action (e.g., ensuring that the broadcast transmission coverage area associate with cell equipment remains unchanged), placing the cellular equipment into a low power stasis state (e.g., the cell equipment, while consuming minimal/sufficient power to monitor the state of the wireless cellular network infrastructure, generally will not use electrical power to project/cast a broadcast coverage area), and/or set the cellular equipment into a state where the cellular equipment is not using power (e.g., the cell equipment is effectively in a powered off state where no discernible power consumption is detectable).

Once zooming engine 102 has determined the group of actions that can be taken by an agent, a reward design (reward function) can be developed. The reward function can be one based on minimizing energy consumption while at the same time maximizing network performance-reducing energy consumption while contemporaneously maintaining good QoS to user equipment.

The group of actions that can be taken by an agent (e.g., a RL agent model instance in execution on system 100) can be designed to provide a zoom recommendation for each cell equipment in the defined number of cells. Illustrative actions are depicted in FIG. 4 as Table 400. The zooming actions can be executed by any supervisory cell equipment that can be responsible for controlling a subordinate cell equipment's transmission power by increasing and/or decreasing the transmission power by a fraction of its current transmission power. For example, if an action 1 is recommended by the agent (e.g., RL agent model executing on system 100), the consequence of the recommendation can be that the transmission power of the respective cell equipment can be decreased by 10% of its current transmission power (e.g., from 100 Watts (W) to 90 W).

The reward function that can be used by an agent can be reflective of an optimization function that encourages the agent to maximize energy efficiency (e.g., minimize energy usage by cell equipment) while at the same time maximizing the QoS experienced by user equipment within the coverage ambit of the cell equipment. An example reward function can be:

$$\text{Reward}(A) = a^1(T+R) - (a^2 * \varepsilon) + \alpha^3 \Delta I_{avg,t}$$

where $a^1$, $a^2$, and $a^3$ represent weights associated with the importance of the user equipment coverage and energy efficiently respectively, T can represent TimeExpiryRRCRelease/total count of RRC attempts (e.g., a count of the number of RRC connection releases due to a timeout. It is increased when an RRC connection is released because a timer has expired, which can be due to inactivity or other timer-related reasons), R can represent RLFRRCRelease/total count of RRC attempts (e.g., a count of the number of RRC connection releases triggered by radio link failure (RLF). RLF that occurs when the quality of the radio link between the user equipment and the network degrades to a point where it is no longer reliable; when this happens, the RRC connection can be released, and a RLFRCRelease counter can be incremented), ε represents a percentage of energy consumption for BaseNode(s) (e.g., cell equipment) and O-RU(s) of maximum power consumption, and $\Delta I^{a,t}$ can represent a difference between a moving average window at time t−1 and t, wherein a negative Δ means interference is being caused by a transmission power change, hence a negative reward (penalty) from this term.

The interference-related term, I, in the RL agent reward function can be utilized to reward/penalize the agent's actions when it causes interference for user equipment. The term can be a moving-average metric with a defined window size. The window generally specifies the time period during which the average SINR is calculated. The moving-average between each window (t and t−1) can be compared, and the Δ is the term included in the reward function. The period of the window can be configurable by an MNO according to their desired granularity and network traffic patterns. For instance, highly fluctuating traffic patterns can require relatively shorter period windows than less fluctuating networks The formula for determining the interference-related term is:

$$\Delta I_{a,t} = I_{avg}^{t} - I_{avg}^{t-1}$$

where:

$$I_{avg}^{t}$$

represents the average SINR at a cell equipment level for period t.

Figure 5:
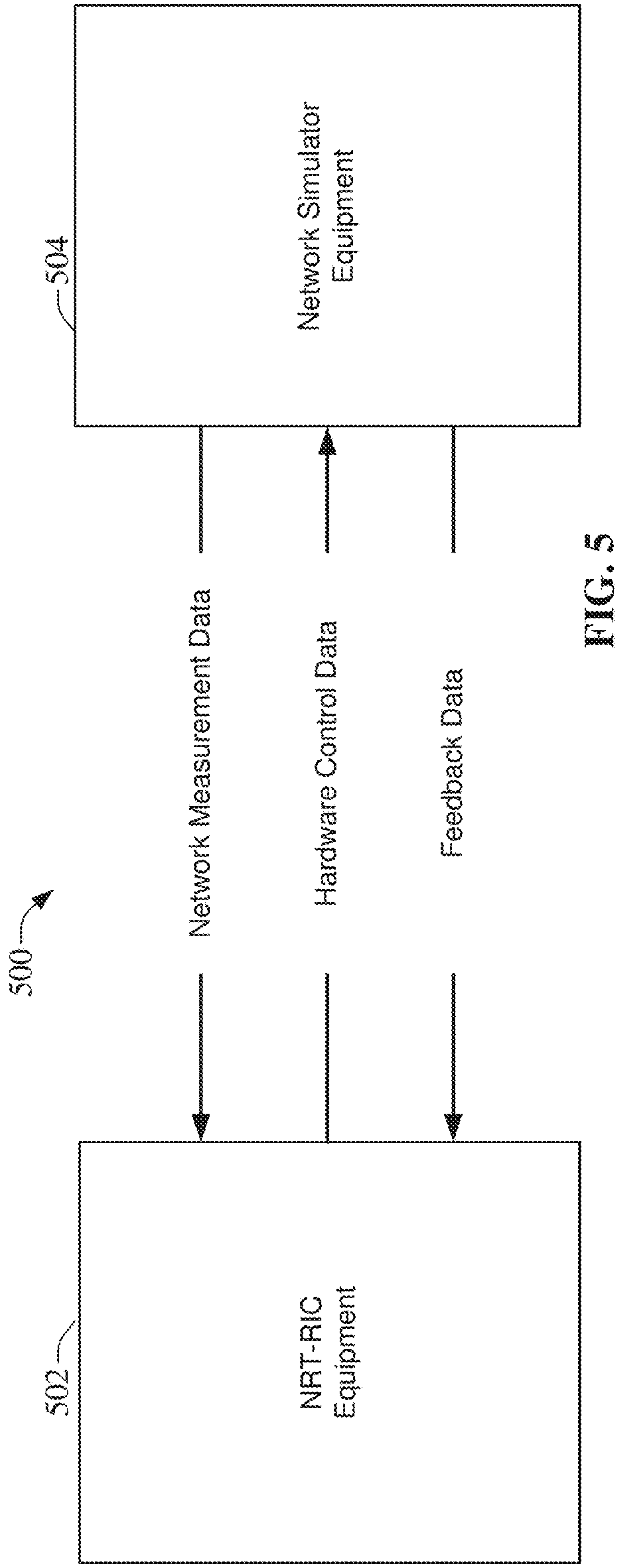
FIG. 5 illustrates a sequence of actions performed when the system is in training mode, in accordance with various non-limiting example embodiments.

In some embodiments, zooming engine 102 can operate in a training mode, wherein zooming agent 102 can be a component associated with near-real time RIC equipment (e.g., system 100 can be near-real time RIC equipment). In training mode the RL agent model can be deployed on non real-time RIC equipment (e.g. non real-time RIC equipment 304) that can be communicatively coupled network simulator equipment. FIG. 5 illustrates a generalized time sequence 500 that depicts the interactions between non real-time RIC equipment 502 and network simulator equipment 504. Example network simulator equipment that can facilitate network simulation for the purposes of this disclosure can include discrete-event network simulator equipment, such as NS-3. This network simulator equipment can provide policy optimization.

The simulation operating on the network simulator equipment 504 can be designed to be similar to scenarios in a live production cellular wireless network infrastructure. Deep reinforcement learning (DRL) can be enabled to take control actions manipulating the operating simulation, and in turn receive feedback that can be used to update a policy to take future actions.

The DRL agent (e.g., RL agent model) can be trained for many episodes (e.g., 100 episodes) in the control environment until it reaches a defined threshold of the reward function. During training, the DRL agent can be encouraged to explore and experiment as it learns which actions are favorable and which are not. When the threshold is reached, the DRL can then be deployed to near real-time RIC equipment (e.g., near real-time RIC equipment 306) in a production environment, connected via the actual MNO cellular wireless network infrastructure.

As depicted in FIG. 5, the non real-time RIC equipment 502 (such as system 100) can receive as input groups of network measurement data from network simulator equipment 504. These groups of network measurement data can be a mix of historic network measurement data and synthetic network measurement data (e.g., measurement data that can have been based on groups of historic network measurements and artificially generated measurement data). Based at least on the input groups of network measurement data, the DRL agent (e.g., operational on non real-time RIC equipment 502) can modify and change values, supply the modified and changed values to the network simulator equipment 504 to identify possible actions that best minimize energy usage by "virtual cell equipment" while at the same time maximizing "virtual user equipment" QoS. The results for the simulation can then be fed back, from network simulator equipment 504 to non real-time RIC equipment 502 in order to refine the DRL agent. This process of receiving groups of network measurement data from network simulator equipment 504, modifying and changing values by the non real-time RIC equipment 502, supplying the changed and modified values back to network simulator equipment 504 as handover control values, and receiving resultant feedback to refine the DRL agent at non-real-time RIC equipment can be repeated numerous times until a threshold value has been reached.

Figure 6:
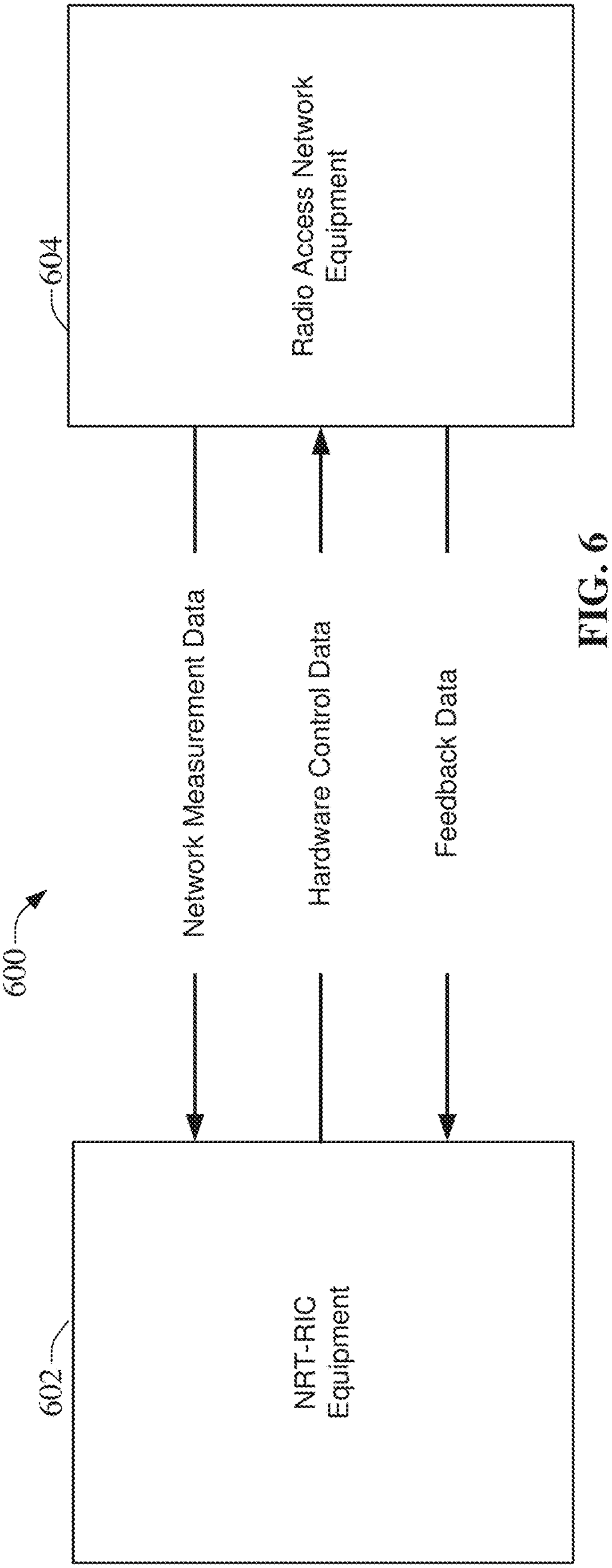
FIG. 6 depicts a second sequence of actions performed with the system in inference (production) mode, in accordance with various non-limiting example embodiments.

Illustrated in FIG. 6 is another generalized time sequence 600, wherein a deployed and trained DRL agent (e.g., RL agent model instance) can be operating in an inference mode (e.g., the deployed RL agent models instance) in a live production environment. In accordance with some embodiments, the DRL agent can be deployed to a near real time RIC equipment 602 (e.g., near real time RIC equipment 306), wherein the near real time RIC equipment 602 can received network measurement data from RAN equipment (e.g., cell equipment, networking equipment, user equipment, and the like). As the DRL agent operates in the production environment, the DRL agent operational on the near real time RIC equipment 602 can still learn and adapt to fluctuations in the cellular wireless network infrastructure. As such, when the trained and deployed DRL agent encounters novel situations/fluctuations, it can adapt to these fluctuations in the wireless network infrastructure. Further, as a function of adapting/updating the DRL agent the DRL agent can evolve to find better policies over time.

When the trained DRL agent is deployed in inference mode, the reward function can be analyzed after the performance of every action, and can be compared against a threshold value that can trigger the DRL agent to be retrained. Further, should the DRL agent's performance deteriorate drastically, the xApp can be paused, until the DRL model is trained again in the network simulator 504 on scenarios that fit the new aggressive change that happened in the wireless network traffic patterns.

The action of increasing/decreasing coverage can be executed by controlling the transmission power of each cell equipment increasing/decreasing it by a fraction of its current transmission power. For instance, if an action 2 is recommended, the transmission power of the respective cell equipment can be decreased by 25% of its current transmission power (e.g., from 80 W to 60 W). The formula for determining the appropriate transmission power is:

$$p = c + c * z$$

where p: represents transmission power value to be applied according to a new nomination, c: represents current transmission power value, and z: represents a zooming factor value output by the DRL agent.

$$f(x) = \begin{cases} p < 0; 0 \\ +z \text{ zooming out, } -z \text{ zooming in} \\ p > \text{MAX}_{-CELL_{TxPower}}; \text{MAX} \end{cases}$$

With regard to neighbor relation table data, this data can comprise data and values such as: an identifier of the cellular equipment in the network (node identifier); an identifier of neighboring cellular equipment that have a direct connection or is within communication range (neighbor node identifier data); signal strength data measured in decibel-milliwatts (dBm)—an indication of the power level of the received signal from neighbor nodes; a qualitative measure of a communication link's reliability, categorized as high, medium, or low based on factors like packet loss data and noise data (link quality); distance measurement data representing approximate distances between two cell equipment, which can be determined based on signal strength values or global position satellite (GPS) data; data relating to the wireless channels on which the cell equipment and/or user equipment are communicating-important in avoiding interference; connection type data indicative of whether the connection is direct (one-hop) or involves a relay (multi-hop through another node); and timestamp data representing the last update to the table entry, reflecting the most recent status of the connection.

Figure 2:
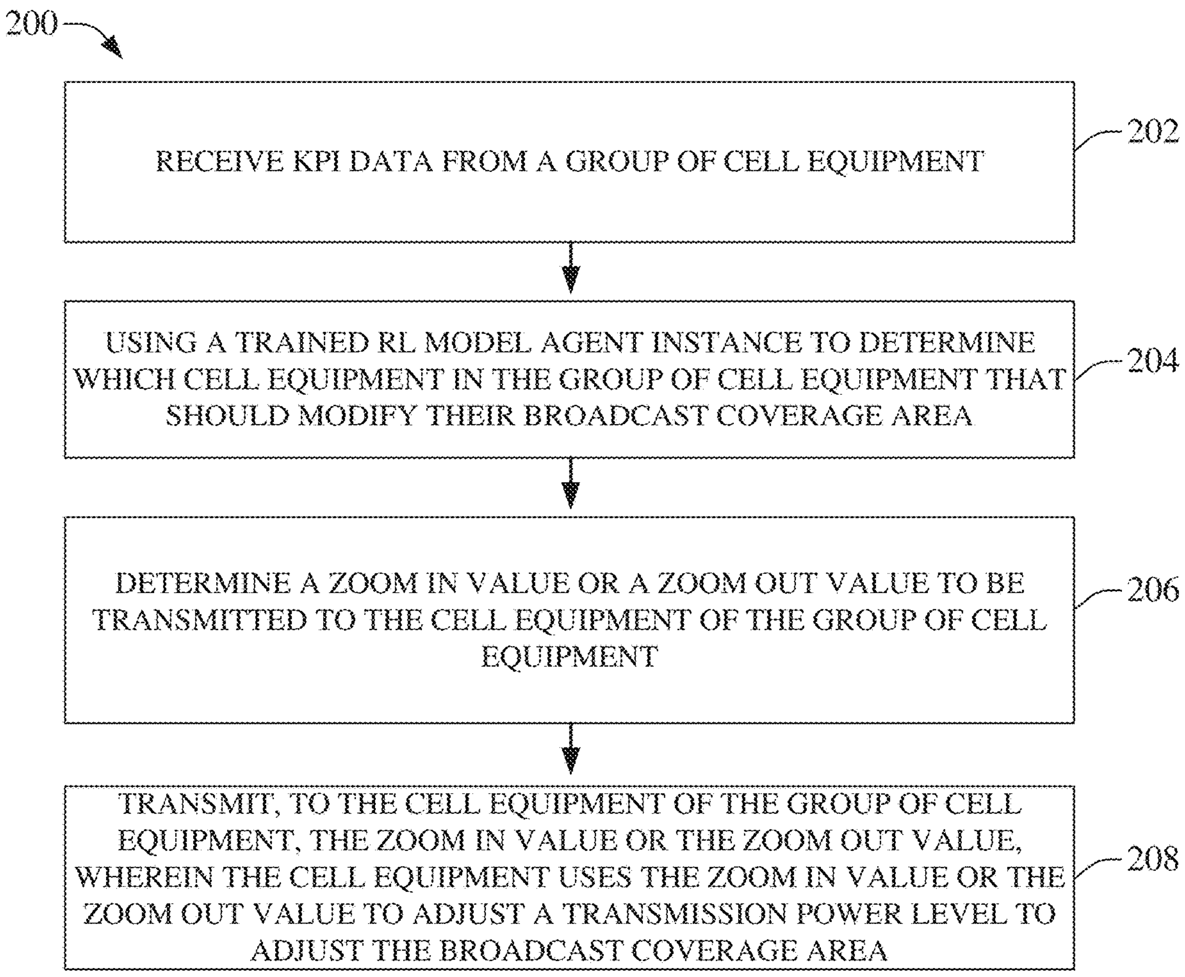
FIG. 2 depicts a method, flow chart, or time sequence, for implementing smart cell zooming using reinforcement learning for energy savings, in accordance with various non-limiting example embodiments.

FIG. 2 illustrates a method 200 for implementing smart cell zooming using reinforcement learning for energy savings, in accordance with various non-limiting example embodiments. Method 200 can commence at act 202 where KPI data can be received from one or more cell equipment. The KPI data can include cell load data and user equipment coverage data. Illustrative cell load data, from each reporting cell equipment, can comprise the location of cell equipment, ANR data, average numbers of RRC connection data for a particular cell equipment (e.g., for each cell equipment), numbers of active user equipment being serviced by a particular cell equipment (e.g. for each cell equipment), PRB data of a particular cell equipment (e.g., for each cell equipment), maximum transmission being expended by a particular cell equipment in projecting a transmission coverage area (e.g., for each cell equipment), and the like. In regard to user equipment coverage data, this data can comprise azimuth data, geographic data associated with the locations of user equipment being serviced by cell equipment, transmission power data (e.g., for each cell equipment), antenna height data (e.g., for each cell equipment), neighbor data (e.g., for each cell equipment for each user equipment), user equipment 5QI data (e.g., for each cell equipment for each user equipment), from each cell equipment for each user equipment, user equipment radio frequency condition data, such as RSRP values, RSRQ values, SINR values, and the like. The cell load data and user equipment coverage data, as detailed earlier, can be used to generate and train a RL agent model (e.g., a DRL agent model) that can be used to minimize energy consumption for cell equipment that can comprise a MNOs cellular wireless network infrastructure.

Once the RL agent model has been trained and deployed to one or more cell equipment, as an RL agent model instance (e.g., a trained RL agent model xAPP instance), at act 204, the RL agent model instance can be used to determine and identify candidate cell equipment that, as the case maybe, can effectively reduce their transmission coverage areas and/or increase their transmission coverage areas to reduce the energy consumption of the cellular wireless network infrastructure as a whole, while at the same time ensuring there is no degradation of QoS for each and every user equipment situated in the coverage ambit afforded by the candidate cell equipment specifically, and all user equipment in the cellular wireless network infrastructure.

At act 206, based on having identified candidate cell equipment and determined zooming in factor values and/or zooming out factor values, the zooming in factor values and/or zooming out factor values can be sent to the identified candidate cell equipment for implementation of the zooming in directive and/or zooming out directive. At act 208, the candidate cell equipment, in response to receiving the zooming in factor values and/or the zooming out factor values, can perform the operations need to carry out the instruction to zoom in or zoom out, by adjusting the transmission power being expended to project their transmission coverage.

Figure 7:
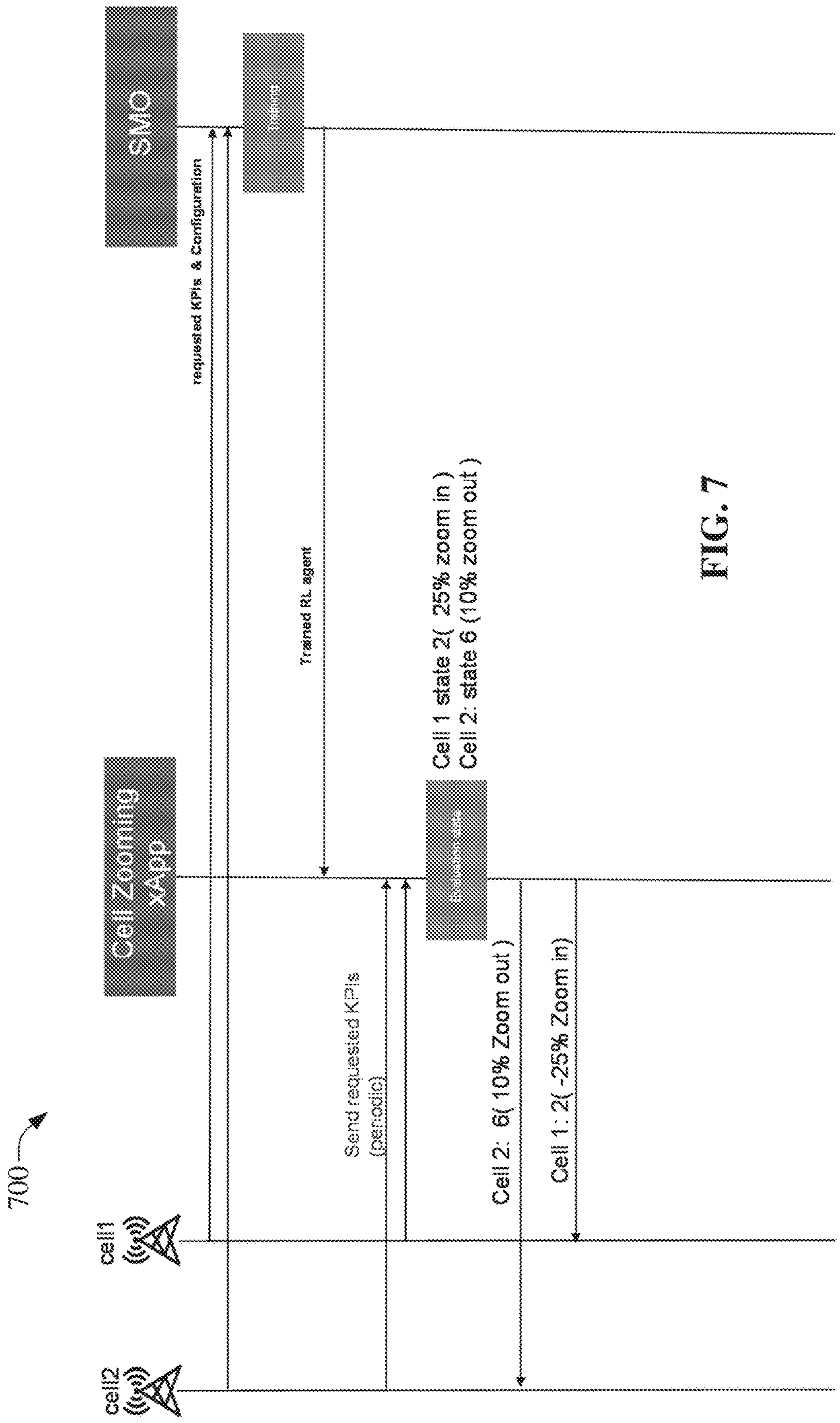
FIG. 7 illustrates a schematic of a system for implementing smart cell zooming using reinforcement learning for energy savings, in accordance with various non-limiting example embodiments.

FIG. 7 illustrates a schematic 700 that outlines the process for implementing smart cell zooming using reinforcement learning for energy savings, in accordance with various non-limiting example embodiments. As depicted in schematic 700, a first cell equipment (cell1) and a second cell equipment (cell2) can each send their respective KPI data and respective cell equipment configuration data to SMO equipment (e.g., SMO equipment 302). The SMO equipment can the generate and train an RL agent model based on the respective KPI data and respective cell equipment configuration data. Once trained the RL agent model (e.g., RL agent model xAPP) can be sent to near real-time RIC equipment (e.g., near real-time RIC equipment 306). Once the trained RL agent model is installed and operational on the near real-time RIC equipment, in response to receiving KPI data and configuration data from cell equipment near real-time RIC equipment can instantiate an instance of the RL agent model (e.g., cell zooming xAPP) to determine and identify candidate cell equipment that can effectively reduce their transmission coverage areas and/or increase their transmission coverage areas to reduce the energy consumption of the cellular wireless network infrastructure as a whole, while at the same time ensuring there is no degradation of QoS for each and every user equipment situated in the coverage ambit afforded by the candidate cell equipment specifically, and all user equipment in the cellular wireless network infrastructure.

Based on having identified candidate cell equipment and determined zooming in factor values and/or zooming out factor values, the zooming in factor values and/or zooming out factor values can be sent to the identified candidate cell equipment for implementation of the zooming in directive and/or zooming out directive. In the example depicted in schematic 700, the RL agent model instantiation has determined that the first cell equipment (cell1) should be zoomed in and that the transmission power associated with the first cell equipment (cell1) should be increased by a factor of 25% (e.g., action 2 as illustrated in 400). Also, as illustrated in 700, the RL agent model instantiation has determined that the second cell equipment (cell2) should be zoomed out and that the transmission power associated with the second cell equipment (cell2) should be reduced by a factor of 10% (e.g., action 6 as illustrated in 400). The RL agent model instantiation can then send these respective zooming in factor values and zooming out factor values to the first cell equipment (cell1) and second cell equipment (cell2), wherein the first cell equipment (cell1) decrease its transmission power to cause a 25% reduction in its broadcast coverage area, and the second cell equipment (cell2) can increase its transmission power to cause a 10% expansion of its broadcast coverage area.

Figure 8:
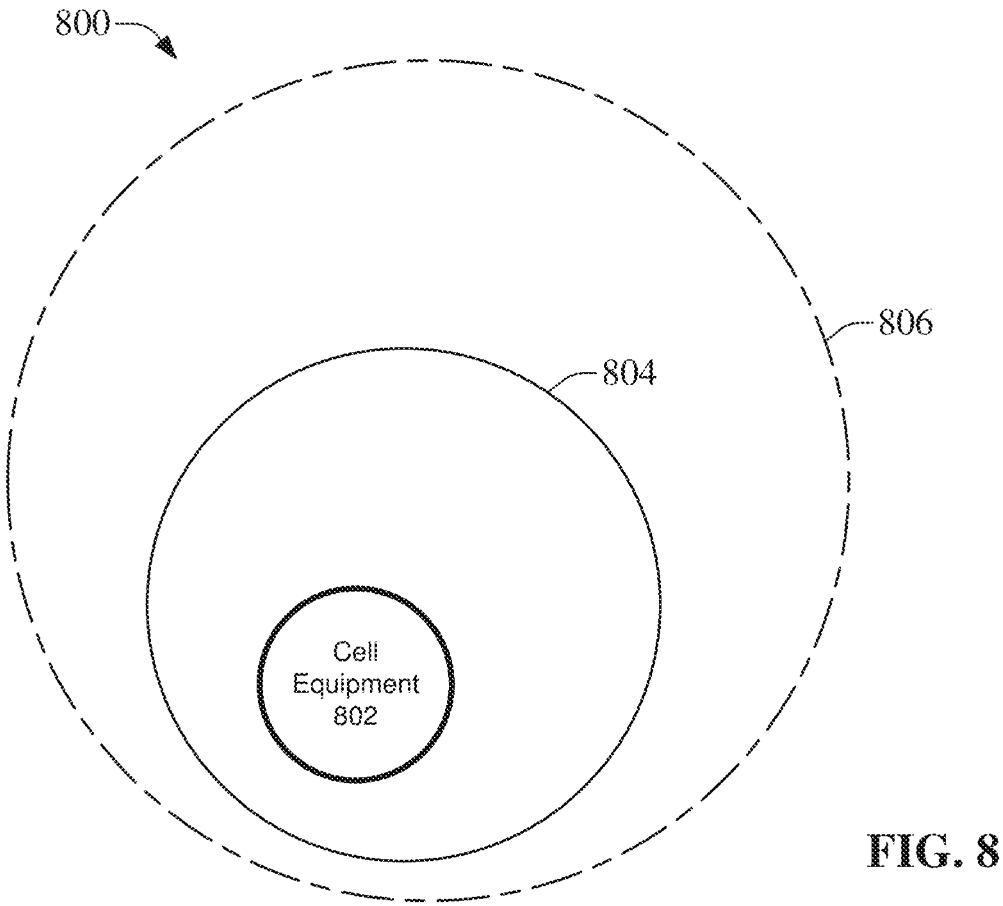
FIG. 8 illustrates varying the projected broadcast coverage area of cell equipment, in accordance with various non-limiting example embodiments.

FIG. 8 illustrates the adjusting of the broadcast coverage areas 800 projected by cell equipment 802. As depicted cell equipment 802 can be projecting a broadcast coverage area depicted by the solid line circle 804. Cell equipment 802, in response to receiving, from a RL agent model instantiation, a directive to expand its projected transmission coverage area, can increase its transmission power to broaden its broadcast coverage as illustrated by the dotted line circle 806.

It will be appreciated by those skilled in the art that the preceding examples and embodiments are exemplary and not limiting to the scope of the present disclosure. It shall also be noted that elements of any claims may be arranged differently including having multiple dependencies, configurations, and combinations.

Figure 9:
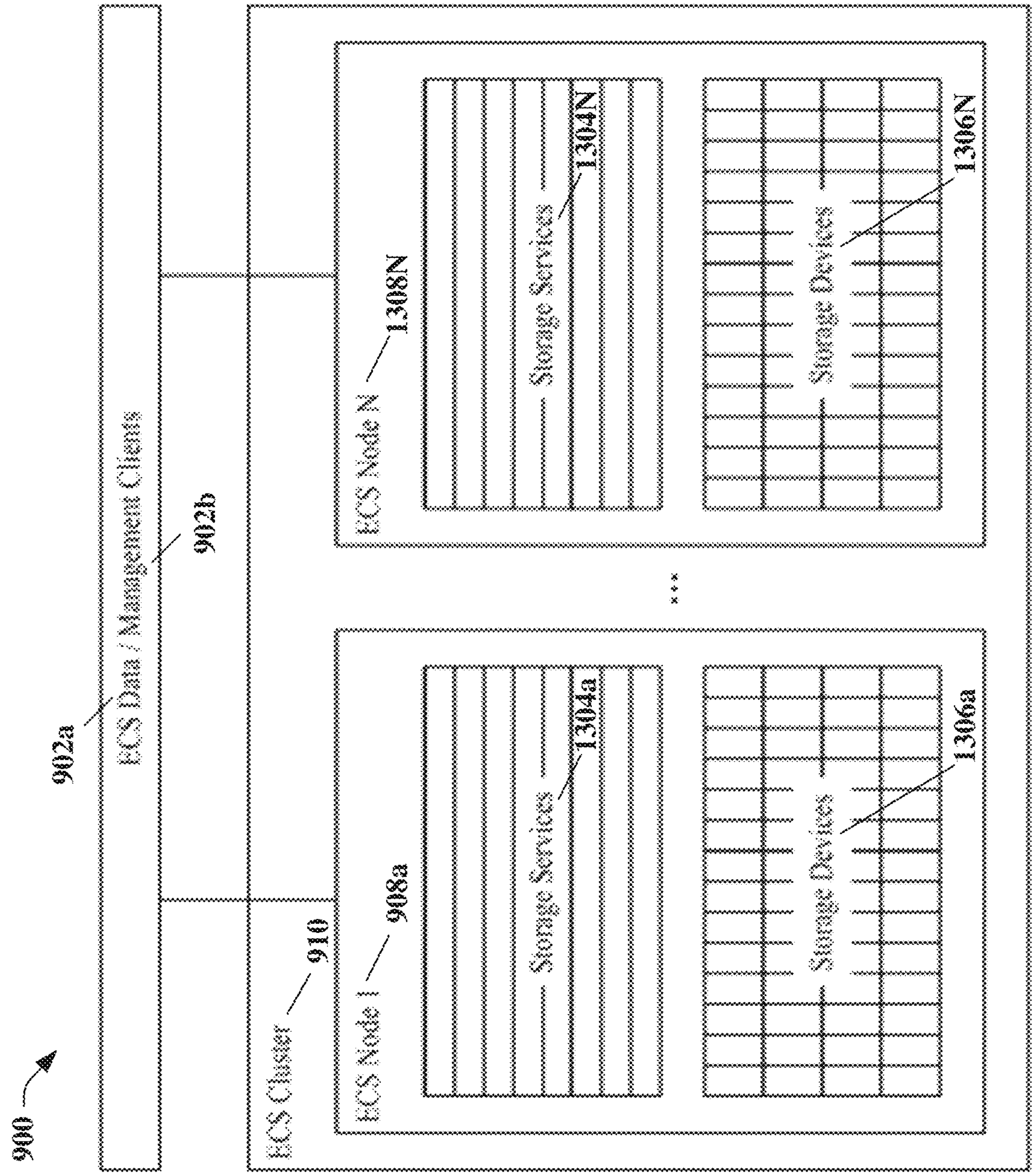
FIG. 9 illustrates a cloud storage systems, such as an elastic cloud storage (ECS) system, in accordance with various non-limiting example embodiments.

In the following, FIG. 9 describes an example non-limiting cloud storage system in the non-limiting context of an ECS storage system, but for the avoidance of doubt, the subject embodiments can apply to any storage platform. For instance, in this regard, FIG. 9 illustrates an ECS storage system 900 comprising a cloud-based object storage appliance in which corresponding storage control software comprising, e.g., ECS data client(s) 902*a*, ECS management client(s) 902*b*, storage service(s) 904*a* . . . 904N, etc. and storage devices 906*a* . . . 906N (e.g., storage media, such as physical magnetic disk media, etc. of respective ECS nodes of ECS cluster 910) are combined as an integrated system with no access to the storage media other than through the ECS storage system 900.

In this regard, ECS cluster 910 comprises multiple nodes 908*a* . . . 908N, storage nodes, ECS nodes, etc. Each node is associated with storage devices 906*a* . . . 906N, e.g., hard drives, physical disk drives, storage media, etc. In embodiment(s), ECS node 908*a*, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 900 can be an append-only virtual storage platform that protects content from being erased or overwritten for a specified retention period. In particular, the ECS storage system 900 does not employ traditional data protection schemes like mirroring or parity protection. Instead, the ECS storage system 900 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 900 can support storage, manipulation, and/or analysis of unstructured data on a massive scale on commodity hardware. As an example, the ECS storage system 900 can support mobile, cloud, big data, and/or social networking applications. In another example, the ECS storage system 900 can be deployed as a turnkey storage appliance, or as a software product that can be installed on a set of qualified commodity servers and disks, e.g., within a node, data storage node, etc. of a cluster, data storage cluster, etc. In this regard, the ECS storage system 900 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc.

and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1022, disk storage 1024, and/or memory storage 1046, further description of which is below. For instance, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
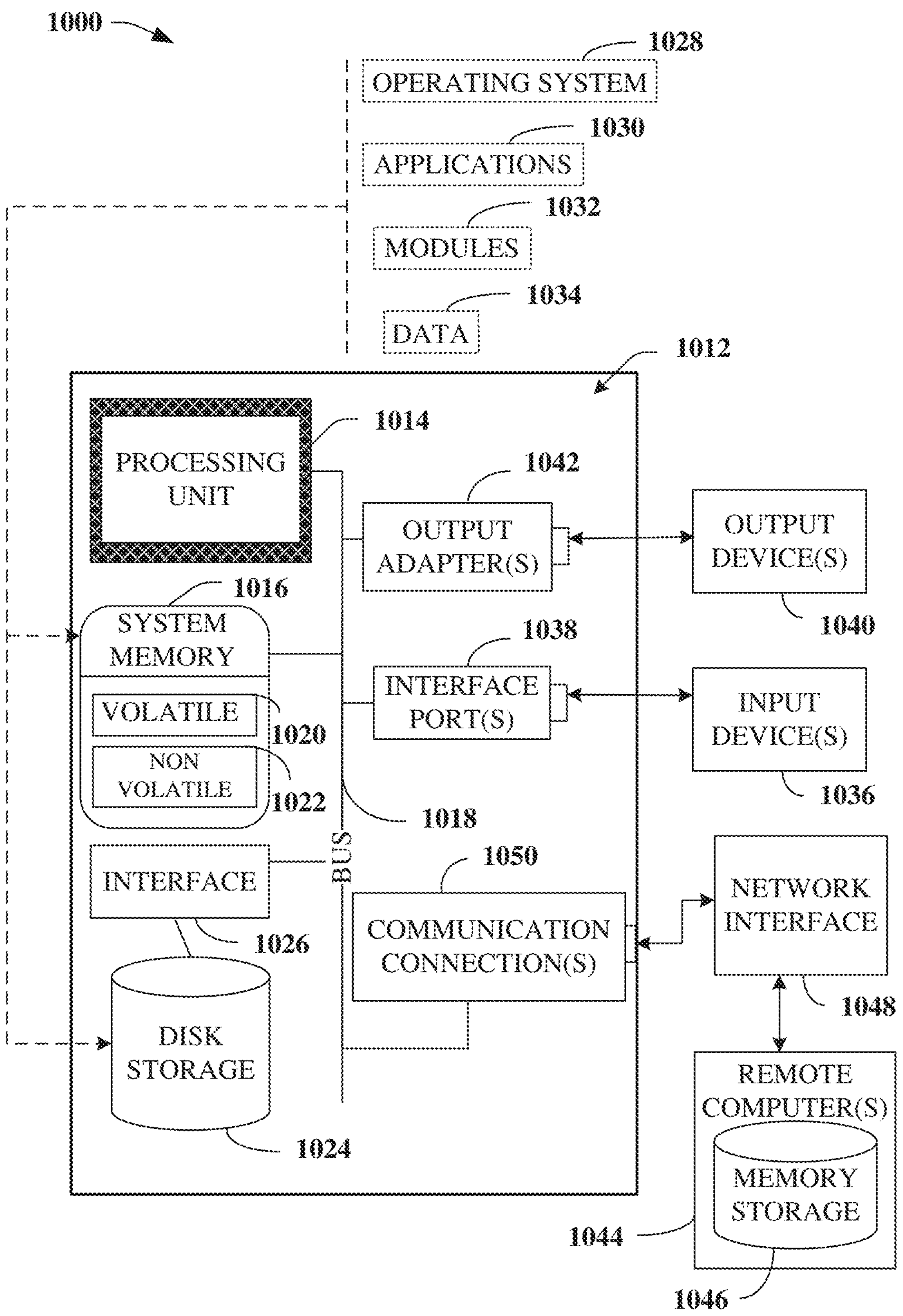
FIG. 10 illustrates a block diagram representing an illustrative non-limiting computing system or operating environment in which one or more aspects of various non-limiting embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

FIG. 10, a block diagram of a computing system 1000, e.g., system 100, operable to execute the disclosed example embodiments, is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at a 10 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. Network equipment, comprising:

at least one processor; and at least one memory that stores executable instructions that, when executed by the at least one processor, facilitate performance of operations, comprising:

receiving, from respective cell equipment, respective key performance indicator data representative of cell equipment load data representative of respective loads corresponding to the respective cell equipment and user equipment coverage data representative of respective coverages of the respective cell equipment with respect to facilitating respective network services for user equipment;

based on the cell equipment load data and the user equipment coverage data, using a trained reinforcement learning model to identify a candidate cell equipment from the respective cell equipment, wherein the candidate cell equipment is determined to be a cell equipment of the respective cell equipment capable of adjusting a broadcast coverage area associated with the candidate cell equipment;

generating, based on the respective key performance indicator data, an action to be performed by the candidate cell equipment and a zooming factor value to be used by the candidate cell equipment to adjust the broadcast coverage area associated with the candidate cell equipment; and transmitting, to the candidate cell equipment, action data representative of the action to be performed and the zooming factor value.

2. The network equipment of claim 1, wherein, as a result of the transmitting of the action data and the zooming factor value, the candidate cell equipment, based on the zooming factor value, is to reduce a transmission power level value associated with enabling the broadcast coverage area associated with the candidate cell equipment.

3. The network equipment of claim 1, wherein, as a result of the transmitting of the action data and the zooming factor value, the candidate cell equipment is to adjust an antenna azimuth to reduce the broadcast coverage area associated with the candidate cell equipment.

4. The network equipment of claim 1, wherein, as a result of the transmitting of the action data and the zooming factor value, the candidate cell equipment is to increase a transmission power level value associated with enabling the broadcast coverage area associated with the candidate cell equipment.

5. The network equipment of claim 1, wherein, as a result of the transmitting of the action data and the zooming factor value, the candidate cell equipment adjusts an antenna azimuth to increase the broadcast coverage area associated with the candidate cell equipment.

6. The network equipment of claim 1, wherein, in response to the transmitting of the action data and the zooming factor value resulting in the candidate cell equipment receiving the action data but not receiving the zooming factor value, the candidate cell equipment is to perform no action, thereby maintaining the broadcast coverage area unchanged.

7. The network equipment of claim 1, wherein, as a result of the transmitting of the action data, the candidate cell equipment is to power down into a hibernation state where no power is expended to enable the broadcast coverage area.

8. The networking equipment of claim 1, wherein, as a result of the transmitting of the action data and the zooming factor value to the candidate cell equipment and as a result of the candidate cell equipment acting, after the transmitting, to adjust the broadcast coverage area associated with the candidate cell equipment, respective power consumption usage levels of the respective cell equipment are reduced.

9. A method, comprising:

receiving, by base station equipment comprising at least one processor, a group of key performance indicators representative of cell equipment load data and user equipment coverage data, wherein the group of key performance indicators is received from a group of cell equipment;

based on the cell equipment load data and the user equipment coverage data, using, by the base station equipment, a trained reinforcement learning model to identify a candidate cell equipment from the group of cell equipment, wherein the candidate cell equipment is identified from at least one of the group of cell equipment comprising a capability to modify a broadcast coverage area associated with the candidate cell equipment;

based on the group of key performance indicators, determining, by the base station equipment, an action to be performed by the candidate cell equipment and a zooming factor value to be used by the candidate cell equipment to modify the broadcast coverage area associated with the candidate cell equipment; and sending, by the base station equipment to the candidate cell equipment, action data representative of the action to be performed and the zooming factor value.

10. The method of claim 9, wherein the cell equipment load data comprises location data associated with at least one of the group of cell equipment.

11. The method of claim 9, wherein the cell equipment load data comprises neighbor relationship data representative of neighbor relationships between at least the candidate cell equipment and the group of cell equipment.

12. The method of claim 9, wherein the cell equipment load data comprises mean data representative of a group of average numbers of radio resource control connections established between each cell equipment included in the group of cell equipment and respective user equipment situated within respective broadcast coverage umbrae associated with each cell equipment.

13. The method of claim 9, wherein the cell equipment load data comprises power level data representative of respective transmission power level values associated with respective cell equipment included in the group of cell equipment.

14. The method of claim 9, wherein the user equipment coverage data comprises location data representative of respective locations of at least one user equipment within respective broadcast coverage areas associated with respective cell equipment included in the group of cell equipment.

15. The method of claim 9, wherein the user equipment coverage data comprises radio frequency condition data representative of respective conditions being experienced by at least one user equipment within respective broadcast coverage areas associated with respective cell equipment included in the group of cell equipment.

16. A non-transitory machine-readable medium, comprising executable instructions that, when executed by at least one processor, facilitate performance of operations, comprising:

receiving, from respective network equipment, respective key performance indicator data representative of network equipment load data representative of respective loads corresponding to the respective cell equipment and user equipment coverage data representative of respective coverages of the respective cell equipment;

based on the network equipment load data and the user equipment coverage data, and based on an output from a trained reinforcement learning model, selecting a candidate network equipment from the respective network equipment, wherein the candidate network equipment is one of at least one network equipment of the respective network equipment determined to be capable of changing a broadcast coverage area associated with the candidate network equipment by changing at least one parameter associated with the broadcast coverage area;

generating, based on the respective key performance indicator data, at least one group of actions to be performed by the candidate network equipment and a zooming factor value to be used by the candidate network equipment to change the broadcast coverage area associated with the candidate network equipment; and transmitting, to the candidate network equipment, action data representative of the at least one group of actions to be performed and the zooming factor value.

17. The non-transitory machine-readable medium of claim 16, wherein the network load data comprises respective location data associated with at least one of the respective network equipment.

18. The non-transitory machine-readable medium of claim 16, wherein the network equipment load data comprises respective data representing respective average numbers of radio resource control connections respectively established between the respective network equipment and respective user equipment situated within respective broadcast coverage umbrae associated with the respective network equipment.

19. The non-transitory machine-readable medium of claim 16, wherein the user equipment coverage data comprises radio frequency condition data representative of respective conditions being experienced by respective user equipment within respective broadcast coverage areas associated with the respective network equipment.

20. The non-transitory machine-readable medium of claim 16, wherein, after the at least one group of action is performed by the candidate network equipment and after the zooming factor value is used by the candidate network equipment to change the broadcast coverage area associated with the candidate network equipment, as a consequence, respective power consumption usage levels of the respective network equipment are reduced.

* * * * *